United States Patent [19]

Miller et al.

[11] Patent Number: 5,034,030
[45] Date of Patent: Jul. 23, 1991

[54] PROCESS OF FLUE GAS CONDITIONING APPLIED TO FABRIC FILTRATION

[75] Inventors: Stanley J. Miller; Dennis L. Laudal, both of Grand Forks, N. Dak.

[73] Assignee: The University of North Dakota School of Engineering & Mines Foundation (UND-SEM Foundation), Grand Forks, N. Dak.

[21] Appl. No.: 528,040

[22] Filed: May 23, 1990

Related U.S. Application Data

[63] Continuation-in-part of Ser. No. 375,205, Jul. 3, 1989, Pat. No. 4,913,073.

[51] Int. Cl.$^5$ .................. B01D 46/04; B01D 51/10
[52] U.S. Cl. .................................... 55/96; 55/97
[58] Field of Search ............... 55/5, 73, 96, 97, 261, 55/266, 341.1, 341.2, 262

[56] References Cited

U.S. PATENT DOCUMENTS

| | | | |
|---|---|---|---|
| 2,356,717 | 8/1944 | Williams | 23/1 |
| 3,686,825 | 8/1972 | Busby | 55/5 |
| 3,689,213 | 9/1972 | Guerrieri | 55/5 |
| 3,933,978 | 1/1976 | Margraf | 423/215.5 |
| 4,042,667 | 8/1977 | Ishiwata et al. | 423/240 |
| 4,058,372 | 11/1977 | DeLaMater | 55/5 |
| 4,070,162 | 1/1978 | Kober et al. | 55/262 X |
| 4,230,465 | 10/1980 | Hope | 55/261 X |
| 4,320,709 | 3/1982 | Hladun | 110/235 |
| 4,325,711 | 4/1982 | Kober et al. | 55/5 |
| 4,333,746 | 6/1982 | Southam | 55/106 |
| 4,469,033 | 9/1984 | Michelfelder | 110/344 |
| 4,779,207 | 10/1988 | Woracek et al. | 364/500 |
| 4,931,073 | 6/1990 | Miller et al. | 55/96 |

FOREIGN PATENT DOCUMENTS

1189192   4/1970   United Kingdom .................... 55/5

OTHER PUBLICATIONS

W. T. Davis et al., "Research on the Removal of SO$_2$ by Additive Injection Techniques on a Stoker-Fired Boiler", 78-28.4, U. of Tenn. Knoxville, Tennessee 39716.
R. C. Carr et al., "Fabric Filter Technology for Utility Coal-Fired Power Plants", Control Technology News, vol. 31, No. 3, Mar. 1984, pp. 281-293.
R. A. Davis et al., "Dry SO$_2$ Scrubbing at Antelope Valley Station", Combustion, Oct. 1979, pp. 21-27.
D. L. Laudal et al., "Flue Gas Conditioning for Baghouse Performance Improvement with Low-Rank Coals", Symposium Proceedings, 14th Biennial Lignite Symposium on the Technology & Utilization of Low-Rank Coals, Dallas, TX, May 15-21, 1987.
S. J. Miller et al., "Flue Gas Conditioning for Improved Fine Particle Capture in Fabric Filters: Comparative Technical and Economic Assessment", Low Rank Coal Research Final Report, vol. II, Advanced Research & Technology, Dept., DOE/MC/10637-2414, vol. 2 (DE 87006532), April, 1987.
S. J. Miller et al., "Mechanisms of Fabric Filter Performance Improvement with Flue Gas Conditioning", Seventh EPA/EPRI Symposium on the Transfer and Utilization of Particulate Control Technology, Mar. 22-25, 1988, Nashville, Tenn.
S. J. Miller et al., "Real-Time Measurement of Respirable Particulate Emissions from a Fabric Filter", 2 Contamination Analysis and Control, Particulate and Multipurpose Processes, p. 663, Hemisphere Publ. Corp. 1987.
S. J. Miller et al., "Particulate Removal Enhancement of a Fabric Filter Using Flue Gas Conditioning", Third (List continued on next page.)

Primary Examiner—Robert Spitzer
Attorney, Agent, or Firm—Zarley, McKee, Thomte, Voorhees & Sease

[57] ABSTRACT

A method of improving control of atmospheric emission of particulate matter from the emission stack of coal combustion facilities which employ baghouse particle controllers is disclosed. The method involves injecting upstream of the baghouse a small but conditioning effective amount of ammonia gas and sulfur trioxide in sequence. When this is done, the pressure drop across the baghouse is less and the amount of particulate matter in the smoke stack emissions is reduced by significant amounts.

15 Claims, 3 Drawing Sheets

OTHER PUBLICATIONS

EPRI Conf. on Fabric Filter Technology for Coal-Fired Power Plants, Scottsdale, Ariz., Nov. 19-21, 1985.

D. L. Laudal et al., "Flue Gas Conditioning for Improved Baghouse Performance", DOE/FE/G01-81-170, Proceedings of the Sixth Symposium of the Transfer and Utilization of Particulate Control Technology, EPRI CS-4918, vol. 3, Nov. 1986.

PROCESS OF FLUE GAS CONDITIONING APPLIED TO FABRIC FILTRATION

CROSS-REFERENCE TO RELATED APPLICATION

This application is a continuation-in-part of co-pending, commonly assigned application Ser. No. 375,205 filed July 3, 1989, now issued as U.S. Pat. No. 4,931,073 dated June 5, 1990.

BACKGROUND OF THE INVENTION

Particulate control in flue gases produced from coal combustion is a complex problem because of the orders of magnitude of particle sizes that one must deal with and the wide range in particulate removal efficiency that is available from various control devices. Particle size in gas process streams may range from 0.01 micron, to 100 micron, where the smaller particles are, for all practical purposes, permanently suspended in the gas stream (i.e. they will not settle out by gravitational forces), while the larger particles are the size of a small grain of sand and will settle out of air at a rate of 5 cm/s. The smallest particles (0.01 micron) are only 1.5 orders of magnitude larger than gas molecules and are very much subject to mass transfer by diffusion. On the other hand, for 100 $\mu$m particles, inertial effects dominate mass transfer operations. Since the aerodynamic effects of the largest and smallest particles are grossly different, particle control immediately becomes complex. A good method for removing larger particles may be completely ineffective for small particles. For example, cyclone separators are highly efficient at removing 20 to 100 micron particles, but 0.01 micron to 1 micron particles pass through cyclones with essentially no removal.

Adding to the complexity of particulate control is the fact that removal efficiency may range from 90 to 99.999% of the total particulate mass, depending on the control method. It might appear that there is a small difference between 99 and 99.999% removal, but this represents three orders of magnitude difference in the amount of pollutant material that enters the atmosphere.

Current best control technology for large coal-fired boilers can generally remove from 99 to 99.9% of the incoming particulate mass. Electrostatic precipitators or baghouses are the technologies which have most often been employed to meet the current standard. If properly designed, these technologies have been successful in most cases.

Current technology can achieve 99.9% particulate removal efficiency on a total mass basis, but the removal efficiency for the fine particle fraction may be much less. The present level of control must meet current emission standards and should also allow operation with a clear stack for good public relations. In addition, the emission of fine particles is an issue because of potential adverse health effects and visibility impairment in the atmosphere.

Most particulate collectors are designed for a given dust. In other words, given a dust with a known particle size distribution, concentration, resistivity, composition, etc., control devices are constructed to collect the dust at a certain design efficiency. One exception to this is flue gas conditioning applied to electrostatic precipitation which improves collection efficiency by changing resistivity, a property of the dust. Flue gas conditioning, however, is usually an add-on method which is applied when the original design does not meet expectations or when new regulations require reduced emissions. If it is possible to modify the dust making it easier to collect by conventional methods, which results in a 100 fold reduction in particulate emissions and improves the operability of the collection device, then a method would be available which could reduce particulate emissions to very low levels without a severe economic penalty.

The objective of the present invention is to provide a method of achieving fine particulate matter control in a manner which fully complies with the Clean Air Act, and which reduces visibility impairment of the atmosphere, and the risk of adverse health effects without significant economic penalty to the coal burning facility.

Another objective of the present invention is to condition particulate fly ash matter from coal combustion plants such that it allows baghouse particle controllers to be much more effective.

An even further objective of the present invention is to provide a baghouse particle controller with an injection system that supplies the particle conditioning gases, ammonia and sulfur trioxide, in a manner such that the pressure drop across a baghouse is decreased and the particulate matter exiting to the atmosphere is decreased.

An even further objective of the present invention is to achieve improved particle matter control of the stack emissions from coal combustion plants which employ reverse-air baghouse particle filters.

Still other objectives include development of a process which allows the size of the baghouse to be reduced and which also increases bag life.

The method and means of accomplishing each of these objectives will become apparent from the detailed description of the invention which follows hereinafter.

SUMMARY OF THE INVENTION

Atmospheric emission of particulate matter from the emission stack of a coal combustion power plant is achieved by injecting upstream of the power plant fabric filters a small but effective amount of ammonia gas and sulfur trioxide. The ammonia is injected upstream of the sulfur trioxide at a sufficient distance to achieve adsorbtion on the surface of fly ash before mixing with sulfur trioxide. Such conditioning achieves a several hundred fold decrease in particle emissions.

DETAILED DESCRIPTION OF THE INVENTION

This invention relates to the use of conditioning agents to enhance particle collection in fabric filters used in coal combustion facilities. In particular, it relates to injection upstream of fabric filters such as shaker-cleaned bags, shake-deflate cleaned bags, pulse-jet-cleaned bags, and reverse-air-cleaned fabric filter bags of a dual stream gas conditioner. The dual stream gas conditioner is comprised of ammonia and sulfur trioxide conditioning agents.

Figure 1:
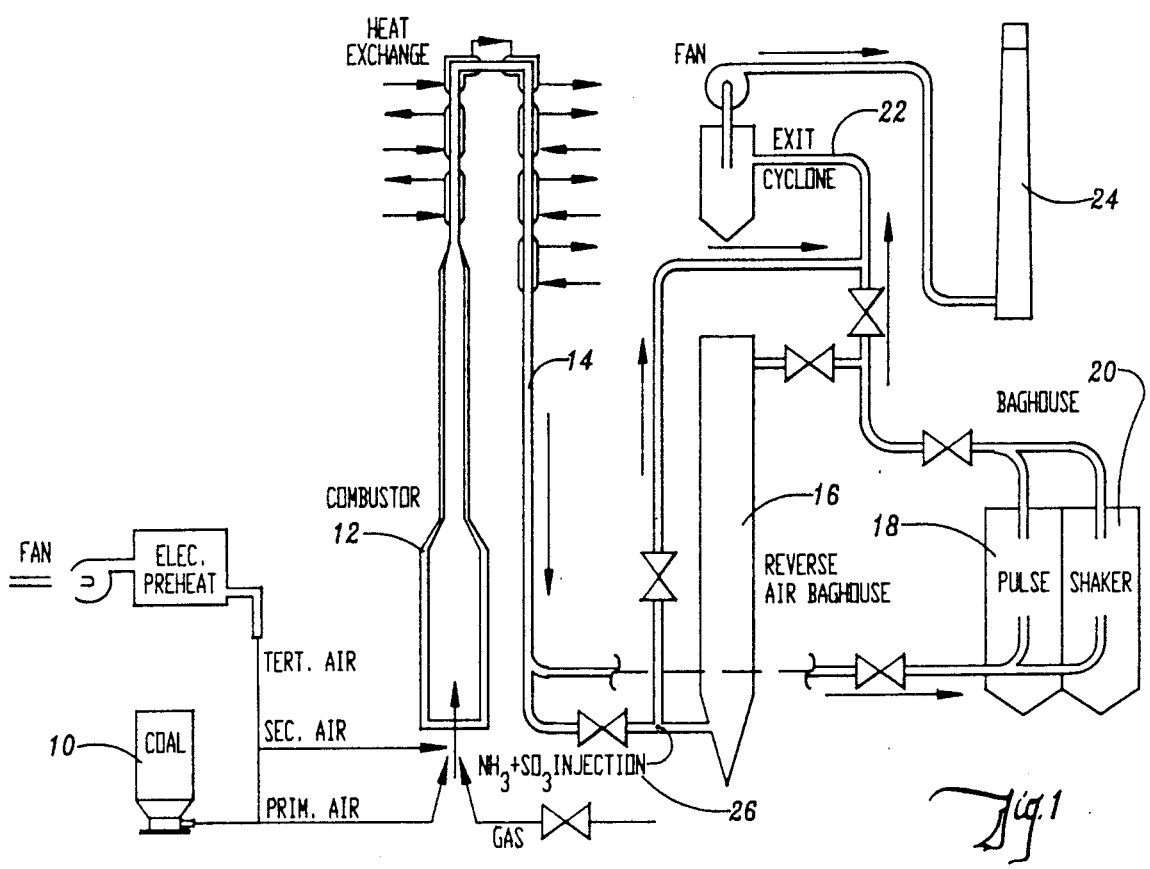
FIG. 1 shows the particulate test combustor and baghouses used in the examples in this invention.

FIG. 1 shows a simplified version of a coal combustion facility flow with various baghouses for testing. It represents the particulate test combustor and baghouses used in the present invention tests as described in the examples. There it can be seen that coal 10 is passed into a combustion chamber 12 wherein it is burned in conventional fashion. Flue gas passes from the combustion chamber 12 via line 14. The flue gas, of course, contains fly ash particulate matter. In the particle test combustor used, the system was set up to allow selective use of reverse air baghouse 16, or pulse jet baghouse 18 or shaker baghouse 20. All three represent different fabric filter systems used in combustion power plants to filter out particulate matter before the gas passes through the filters. The filters are represented at 16, 18 and 20 and the gas goes from there into an exit line 22 and from there to exit stack 24 for exit of the emissions to the atmosphere.

In short, FIG. 1 represents a simplified version of a coal combustion facility. Importantly, the pilot sized baghouse 16 as depicted in FIG. 1, employs a full-size bag and has been shown to represent actual baghouses.

In accordance with this invention as depicted at line 26 upstream of the baghouses, represented at 16, 18 and 20, the method of the present invention involves injection of a stream of gaseous ammonia and gaseous sulfur trioxide.

The amount of ammonia and sulfur trioxide injected is a small but particle conditioning effective amount. In practice, the ratio of ammonia to sulfur trioxide should be within the range of from 1:1 to 3:1 and preferably about 2:1. The amount, on a parts per million basis, should be from about 2 parts per million to about 200 parts per million of ammonia and from about 1 part per million to about 100 parts per million of sulfur trioxide. Preferably the amount of ammonia is from 12 parts per million to about 50 parts per million and the amount of sulfur trioxide from about 6 parts per million to about 25 parts per million. Very satisfactory results are achieved at levels of 25 parts per million ammonia and 12 parts per million of sulfur trioxide.

With pulse jet baghouses 18, shaker baghouses 20, and reverse air baghouses, the process of the present invention is to inject upstream of the baghouse ammonia gas and sulfur trioxide gas with the ammonia being injected upstream of the sulfur trioxide. Separate injection of the ammonia upstream of the sulfur trioxide is an important part of the process because it allows the ammonia to mix with flue gas prior to the introduction of sulfur trioxide. This enhances the process of mass transfer of conditioning agents onto the surface of the particulate matter. If the ammonia and the sulfur trioxide are allowed to mix prior to introduction to the gas stream or before complete mixing with the gas stream, ammonium sulfate precipitate will form and mass transfer of conditioning agents to the surface of the particles may be inhibited.

The preferred process of the present invention is to inject the ammonia upstream of the sulfur trioxide with sufficient residence time to allow the ammonia to be substantially adsorbed on the surface of the fly ash prior to mixing with sulfur trioxide. When the sulfur trioxide is then added, it reacts primarily with the ammonia on the fly ash producing a thin surface layer of ammonia-sulfur trioxide product. Reaction of ammonia and sulfur trioxide in gas phase is to be avoided because this will result in a fine precipitate that is suspended in the flue gas. This fine suspended precipitate is undesirable for two reasons. Firstly, fine particles will not transfer readily to the surface of the fly ash so the given amount of injected ammonia and sulfur trioxide will not be as effective. Secondly, the presence of additional fine particles in the flue gas, produced from the gas phase reaction of ammonia and sulfur trioxide may actually increase emissions of fine particles under some circumstances, which is opposite of the desired effect of reduced fine particle emissions.

Sequential injection of the ammonia and sulfur trioxide includes the injection of sulfur trioxide upstream of the ammonia. This is desirable in some special cases where the fly ash might have a low affinity for ammonia and a high affinity for sulfur trioxide. In these special cases the explanation is similar in that the sulfur trioxide should be injected far enough upstream of the ammonia injection to allow the sulfur trioxide to be substantially adsorbed on the surface of the fly ash prior to introducing the ammonia. Again, reaction of the ammonia and sulfur trioxide in gas phase, forming increased fine particles, is to be avoided.

The residence time, or dwell time for the ammonia to allow it to be substantially adsorbed on the surface of the fly ash prior to mixing with sulfur trioxide, will depend on the velocity of the flue gas stream and number of injection nozzles but generally should be within the range of 0.05 seconds to 2.0 seconds before sulfur trioxide introduction. For example, adequate residence time would typically be provided by injecting ammonia at least 10 duct diameters upstream from the sulfur trioxide introduction. In short, the guideline to follow is injection sufficiently far upstream to allow the ammonia to be substantially adsorbed on the surface of the fly ash before movement to the point at which the sulfur trioxide is introduced.

The purposes of injecting the chemical conditioning agents are several. First it improves the particulate collection efficiency. Secondly, it reduces baghouse pressure drop. Third, it increases bag life. And fourth, it reduces the required size of the baghouse. The most significant problem with the operation of baghouses is controlling the pressure drop across the filter. As dust is collected on the bags, the pressure drop across the baghouse increases to the point where fan capacity and structural limitations demand that the bags be cleaned. With pulse-jet baghouses, this is accomplished by a jet of high-pressure air on the inside of the bags. With shaker baghouses, bag cleaning is accomplished by shaking the top of the bags. With reverse-air baghouses, bag cleaning is accomplished by reversing the direction of gas going through the bags at the same approximate velocity as the filtering face velocity. Reverse-air cleaning is considered the most gentle cleaning method and, subsequently, is most subject to high pressure drop problems. Gentle cleaning is desirable because it facilitates long bag life. More vigorous cleaning can be employed, but usually at the expense of bag life. Therefore, the goal in design and operation of fabric filters is to employ a bag cleaning method that will effectively control pressure drop and allow long bag life.

The fact that reverse-air baghouses are prone to bag cleaning problems is demonstrated by the need for bag cleaning assistance. An example of such assistance is the widespread use of sonic horns to facilitate bag cleaning with full-scale, reverse-air baghouses, but sonic horns are not typically used with pulse-jet or shaker baghouses. Since early conditioning tests with bench-scale, shaker-cleaned bags showed that conditioning increases the cohesive strength of the ash, the logical conclusion is that conditioning with ammonia and sulfur trioxide would cause additional bag cleaning problems with reverse-air baghouses. However, tests showed that conditioning works well with reverse-air baghouses and does not cause bag cleaning problems, contrary to logical expectations. The scale-up from bench-scale to a full-scale bag is a significant development of the technology. Typically, results with bench-scale fabric filters are viewed with skepticism because they do not duplicate the bag cleaning conditions with full-scale bags, and, therefore, would not accurately predict pressure drop. The original bench-scale tests employed cleaning methods more vigorous than any methods used in full-scale bags, and did not attempt to simulate full-scale bag cleaning. However, the subsequent tests were specifically conducted with a full-scale, reverse-air cleaned bag in a manner that duplicates bag cleaning in full-scale baghouses. These results showed that conditioning significantly reduced particulate emissions and baghouse pressure drop, providing a strong evidence that conditioning will be effective with reverse-air baghouses.

The following examples are offered to further illustrate but not limit the process of the present invention.

EXAMPLES

EXAMPLE 1

A schematic of the Particulate Test Combustor and baghouses is shown in FIG. 1. The 0.16 MW combustor is preheated firing natural gas, and the baghouses are preheated electrically to prevent condensation during startup. Once the combustor is heated to normal operating temperature on gas, it is switched to firing pulverized coal while the flue gas is filtered by the pulse jet baghouse. After achieving stable combustion on coal, the flue gas is introduced to the reverse air baghouse for the start of a test. Particulate emissions and baghouse pressure drop are then monitored as a function of time to document the process of dust cake buildup on the fabric. Flue gas is continuously monitored for oxygen, carbon dioxide, sulfur dioxide, and nitrogen oxides and, along with system temperatures and pressures, is recorded on a data logger.

The reverse air baghouse contains a single, full-scale bag 0.3 m in diameter by 9.1 m in length. All tests were started with a new bag. The bag fabric was a Midwesco 610E. This fabric is typical of fabrics used in large-scale, reverse air baghouses filtering flue gas from utility coal-fired boilers. The 339 g/m² (10 oz/sq yd) fabric is 3×1 twill woven glass construction with 10% Teflon B finish. The fill yarns are texturized while the warp yarns are not texturized. The dirty side (inside) of the bag has a surface of approximately 75% texturized yarns. The reverse air bag was cleaned by first directing the flue gas through the pulse jet baghouse and then backwards through the reverse air baghouse for a period of 45 seconds. The filtering air/cloth ratio (face velocity) and the cleaning velocity for the reverse air tests were 0.64 m/min. The baghouse temperature for all tests was 422 K. (300° F.). The bag was suspended with a load cell which permits continuous monitoring of the bag weight. The initial bag tension for the tests was 334N (75 lb). The top of the bag suspension cap contained a 0.25 m diameter glass sight port which, along with sight ports in the top of the baghouse, permitted viewing of the inside of the bag during bag cleaning. Sight ports were also located along the side of the baghouse which allowed viewing the clean side of the bag.

Figure 3:
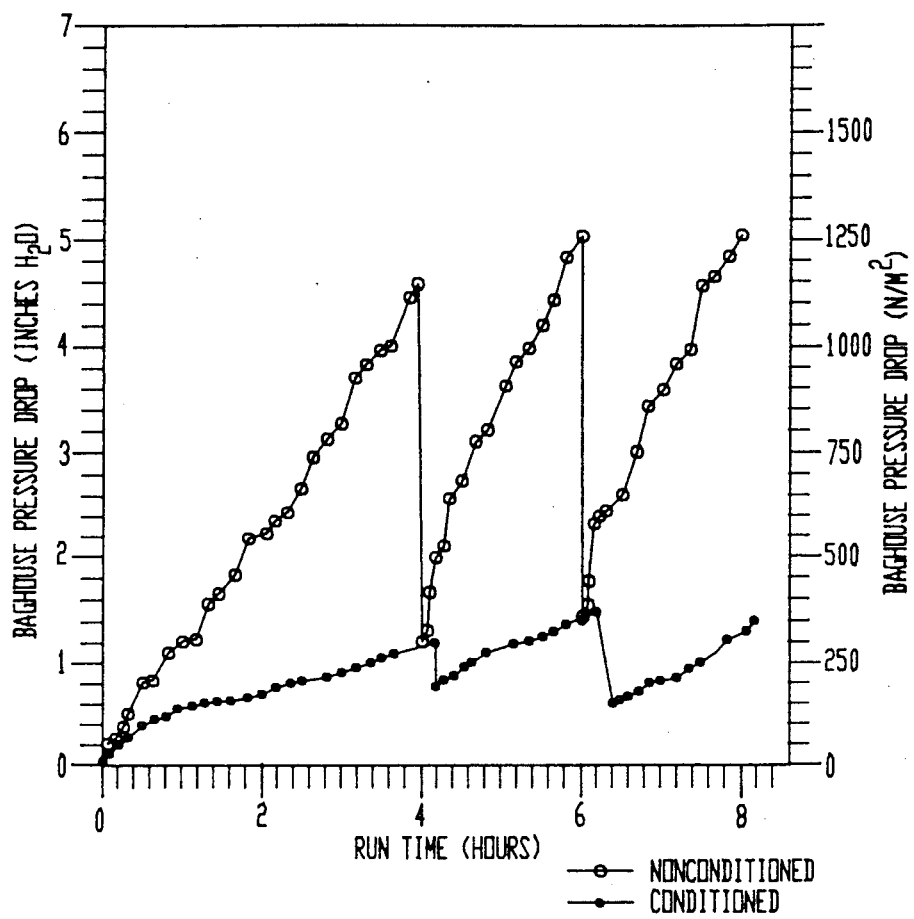
FIG. 3 shows baghouse pressure drop for an 8-hour reverse air baghouse test with and without use of the invention for a bituminous coal.
Figure 4:
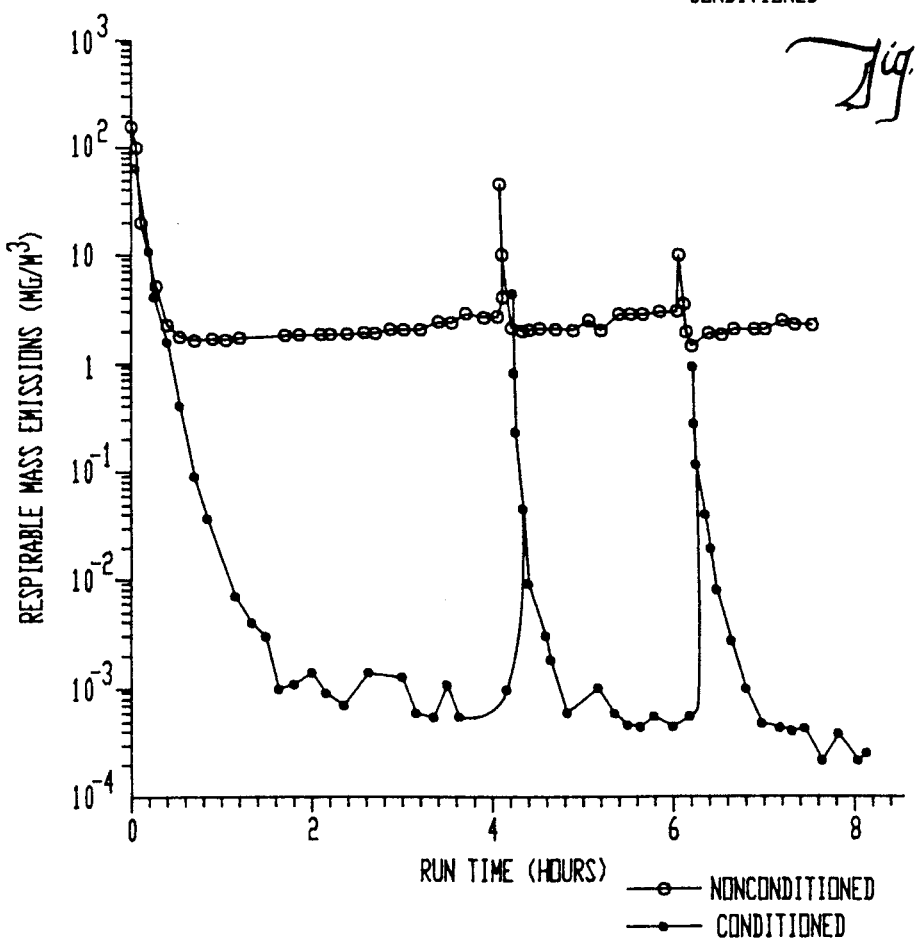
FIG. 4 shows particulate emissions for an 8-hour reverse air baghouse test both with and without use of the invention for a bituminous coal.
Figure 5:
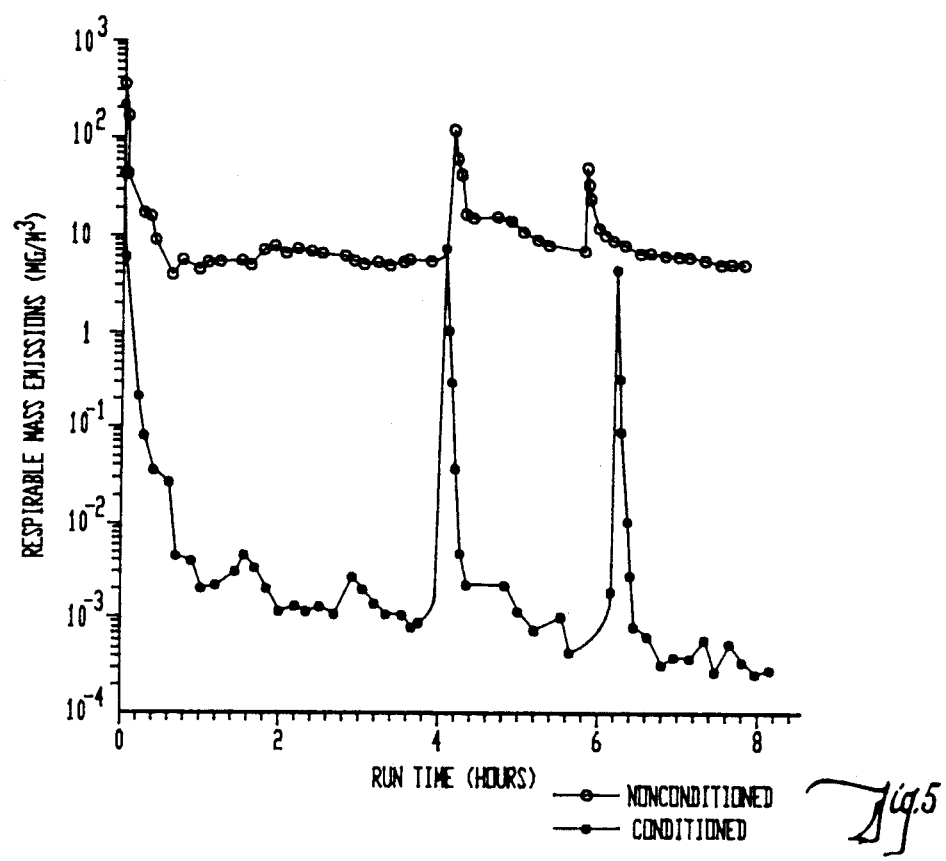
FIG. 5 shows particulate emission for an 8-hour reverse air baghouse test both with and without use of the invention for a lignite coal.

The effects on baghouse operation were determined by measuring baghouse pressure drop for 8-hour reverse air bag-house tests for two coals (FIGS. 2 and 3) and by measuring respirable mass particulate emissions (FIGS. 4 and 5).

Figure 2:
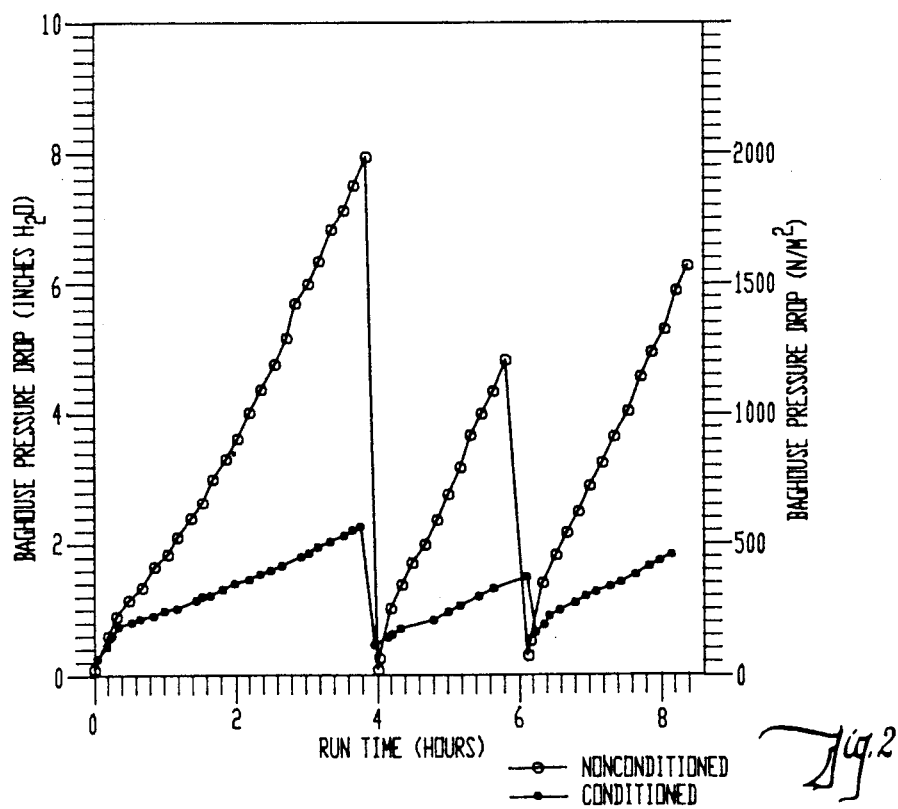
FIG. 2 shows baghouse pressure drop for an 8-hour reverse air baghouse test with and without use of the invention for a lignite coal.

Baghouse pressure drop is plotted as a function of run time for the 8-hour tests in FIGS. 2 and 3. The significant reduction in pressure drop as a result of the conditioning is clear from the graph. At the start of each test, the total tube sheet pressure drop is the pressure drop across the new fabric, which is approximately 12 N/m² (0.05 inches of water). Since this is small compared to pressure drop with a dust cake, the total tube sheet pressure drop can be considered to be caused by the dust on the fabric. After bag cleaning, some dust always remains on the fabric; therefore, after-bag-cleaning pressure drop is never as low as the starting pressure drop with new bags. Except for an initial filtration period when the dust is primarily collected at the yarn junctions, the pressure drop increases approximately linearly with time. A linear increase in pressure drop is expected assuming the dust loading and face velocity remain constant, the dust particle size distribution remains constant, and the dust cake porosity does not change. From FIGS. 2 and 3, the before bag cleaning pressure drop is about 3 to 4 times lower for the conditioned tests compared to the baseline tests.

Results of the particulate emission measurements by EPA Method 5 are shown in Table 1. Comparing the outlet dust loadings between the conditioned and baseline tests, total mass particulate emissions were 77 times lower with conditioning for the Pittsburgh #8 tests and 280 times lower for the Monticello tests. Results of the APS measurements for the 8-hour tests are shown in FIGS. 4 and 5. Each datum point on the graphs represents a complete measurement of the actual particle size distribution with the APS in the range of 0.5 to 30 micron. The APS has a feature which combines emissions for each measurement into a single term called respirable mass. This is a sum of particle mass between 0.5 and 10 micron including all particles from 0.5 to 1.5 micron and a decreasing percentage of the particle mass from 1.5 to 10 micron.

TABLE 1

BAGHOUSE PARTICULATE REMOVAL EFFICIENCY MEASURED BY EPA METHOD 5 DUST LOADINGS

| TEST | Dust Loading (grams/m³) Inlet | Outlet | % Removal Efficiency |
| --- | --- | --- | --- |
| Pittsburgh #8 baseline | 9.69 | 0.0140 | 99.856 |
| Pittsburgh #8 conditioned | 10.2 | 0.00018 | 99.998 |
| Monticello baseline | 15.7 | 0.0504 | 99.678 |

TABLE 1-continued

BAGHOUSE PARTICULATE REMOVAL EFFICIENCY
MEASURED BY EPA METHOD 5 DUST LOADINGS

| TEST | Dust Loading (grams/m$^3$) Inlet | Outlet | % Removal Efficiency |
|---|---|---|---|
| Monticello conditioned | 15.7 | 0.00018 | 99.999 |

The graphs in FIGS. 4 and 5 show that conditioning reduces respirable mass particulate emissions from 3 to 4 orders of magnitude, except for a short time after bag cleaning. The conditioned tests for both coals resulted in almost identical emissions of about $10^{-3}$ mg/m$^3$. Comparing this value with inlet concentrations of about 1050 mg/m$^3$ for Monticello and 300 mg/m$^3$ for Pittsburgh #8 results in a respirable mass collection efficiency of 99.9999% for Monticello and 99.9997% for Pittsburgh #8 coal. These collection efficiencies are about one order of magnitude better than the EPA Method 5 efficiencies, however, EPA Method 5 is probably not sensitive enough to accurately measure dust concentrations this low. Therefore, a difference in collection efficiency between the two methods at very low dust concentrations might be expected.

It can be seen from Table 1 and FIGS. 2–4 that in every instance the pressure drop across the baghouse with the conditioned flue gas was significantly less and that particle removal efficiency was many times greater. Thus it can be seen that the invention accomplishes all of its stated objectives.

EXAMPLE 2

As earlier stated, concentrations should be within the ranges of 12 ppm to 50 ppm for the ammonia and 6 ppm to 25 ppm for the sulfur trioxide. Samples of fly ash are then collected from the baghouse without the use of conditioning agents and at the given concentrations of ammonia and sulfur trioxide, and these samples are then analyzed for aerated and packed porosities. An example of actual results with conditioned and baseline ashes (without conditioning) is shown in Table 2. If results show that either the packed or aerated porosity increases with conditioning, it is an indication that conditioning is effective. At this point the user must decide whether even further improvements in baghouse performance are needed. If this is the case, the concentrations of ammonia and sulfur trioxide are doubled and baghouse ash samples are again analyzed. A calculation is then made as to the increase in porosity with original concentrations versus the increase in porosity with concentrations doubled. The incremental increase in porosity is then compared in the two cases to quantify the effectiveness of conditioning agents. If only a slight increase in porosity is seen upon doubling of concentrations, then the original 25 ppm ammonia and 12 ppm sulfur trioxide are more likely to be employed. On the other hand, if doubling of the concentrations results in a proportionate increase in porosity, there is justification to use the higher concentrations. This same procedure can be employed to reduce concentrations from the starting values of 25 ppm ammonia and 12 ppm sulfur trioxide. If initial results show that porosities are increased substantially, the concentrations can be cut in half and the proportionate drop in porosity can be used as a measure of the effectiveness of a proportionate increase or decrease in conditioning agent concentrations.

Figure 6:
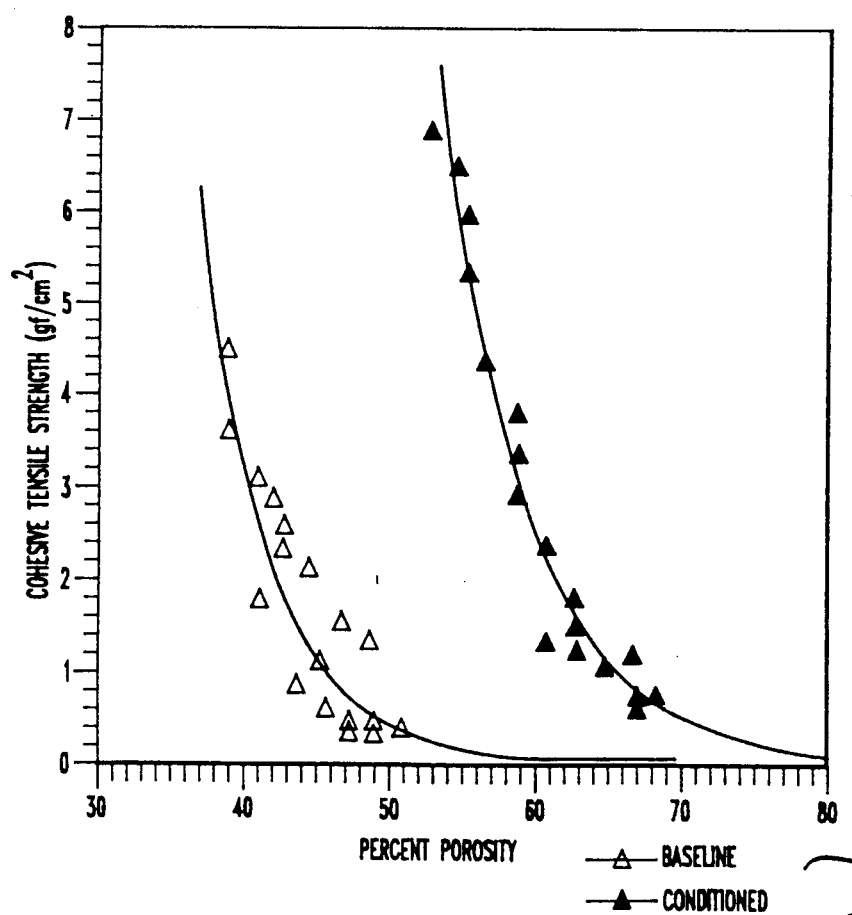
FIG. 6 shows an example of actual tensile strength results with conditioned and baseline (nonconditioned) ashes.

In addition to the aerated and packed density measurements, tensile strength of the baghouse hopper ash samples is measured as a function of compaction pressure with a Cohetester. An example of actual tensile strength results with conditioned and baseline ashes is shown in FIG. 6. The baseline data are without the use of conditioning agents. Conditioned data are from tests with 25 ppm ammonia and 12 ppm sulfur trioxide with the ammonia injected sufficiently far upstream of the sulfur trioxide. If conditioning is effective, tensile strength is increased at constant porosity or porosity is increased at constant tensile strength, as shown in FIG. 6. Again, the same procedure is applied whereby the conditioning agent concentrations are doubled or halved to measure the relative shift in the tensile strength curve to determine the effectiveness of an incremental change in the conditioning agent concentrations.

TABLE 2

AERATED AND PACKED POROSITY

| Ash type | Aerated porosity % | $\sigma^a$ | n$^b$ | Packed porosity % | $\sigma$ | n |
|---|---|---|---|---|---|---|
| Monticello baseline | 62.6 | 0.6 | 9 | 40.1 | 0.8 | 9 |
| Monticello conditioned | 75.8 | 1.5 | 10 | 55.0 | 1.2 | 11 |

$^a\sigma$ = standard deviation
$^b$n = number of tests

What is claimed is:

1. A method improving control of atmospheric emission of particulate matter such as fly ash from the emission stacks which employ baghouse particle controllers said method comprising:
   injecting upstream of said baghouse a small but particle conditioning effective amount of ammonia gas and sulfur trioxide gas, with said ammonia being injected upstream of said sulfur trioxide a sufficient distance to allow the ammonia to be substantially adsorbed on the surface of the fly ash prior to mixing with sulfur trioxide.

2. The method of claim 1 wherein the residence time of the ammonia with the fly ash prior to admixing with sulfur trioxide is within the range of from 0.05 seconds to 2.0 seconds.

3. The method of claim 2 wherein the ammonia is introduced upstream at least 10 duct diameters from said sulfur trioxide.

4. The method of claim 1 wherein said baghouse controller is a pulse jet baghouse.

5. The method of claim 1 wherein said baghouse controller is a shaker or shake-deflate baghouse.

6. The method of claim 1 wherein said baghouse controller is a reverse-air baghouse.

7. The method of claim 1 wherein the parts per million ratio of ammonia to sulfur trioxide is within the range of 0.3:1 to 3:1.

8. The method of claim 7 wherein said parts per million ratio of ammonia to sulfur trioxide is 2:1.

9. The method of claim 1 where the amount of ammonia is within the range of from about 2 parts per million to about 200 parts per million and the amount of sulfur trioxide is within the range of from about 1 part per million to about 100 parts per million.

10. The method of claim 9 wherein the amount of ammonia is within the range of from about 12 parts per million to about 50 parts per million and the amount of sulfur trioxide is within the range of from about 6 parts per million to about 25 parts per million.

11. A method of controlling atmospheric emission of particulate matter from the emission stack of coal combustion facility, said method comprising:
   (a) combusting coal material to provide heat energy along with associated flue gas containing particulate ash material;
   (b) passing said flue gas and associated particulate ash material through a reverse air baghouse particle controller; and
   (c) upstream from said reverse air baghouse controller injecting small but particle conditioning effective amounts of ammonia gas and sulfur trioxide with the first injected conditioning gas injected sufficiently far upstream of the second to be substantially adsorbed onto said ash material before the second gas is injected.

12. The method of claim 11 wherein the residence time of the ammonia with the fly ash prior to admixing with sulfur trioxide is within the range of from 0.05 seconds to 2.0 seconds.

13. The method of claim 12 wherein the ammonia is introduced upstream at least 10 duct diameters from said sulfur trioxide.

14. The method of claim 11 wherein said first injection of conditioning gas is of sulfur trioxide.

15. The method of claim 11 wherein said ammonia is injected further upstream of said baghouse than sulfur trioxide.

* * * * *